July 26, 1927.                T. J. BARNES                1,637,098
                              PULVERIZER
                          Filed Feb. 6, 1925           2 Sheets-Sheet 2

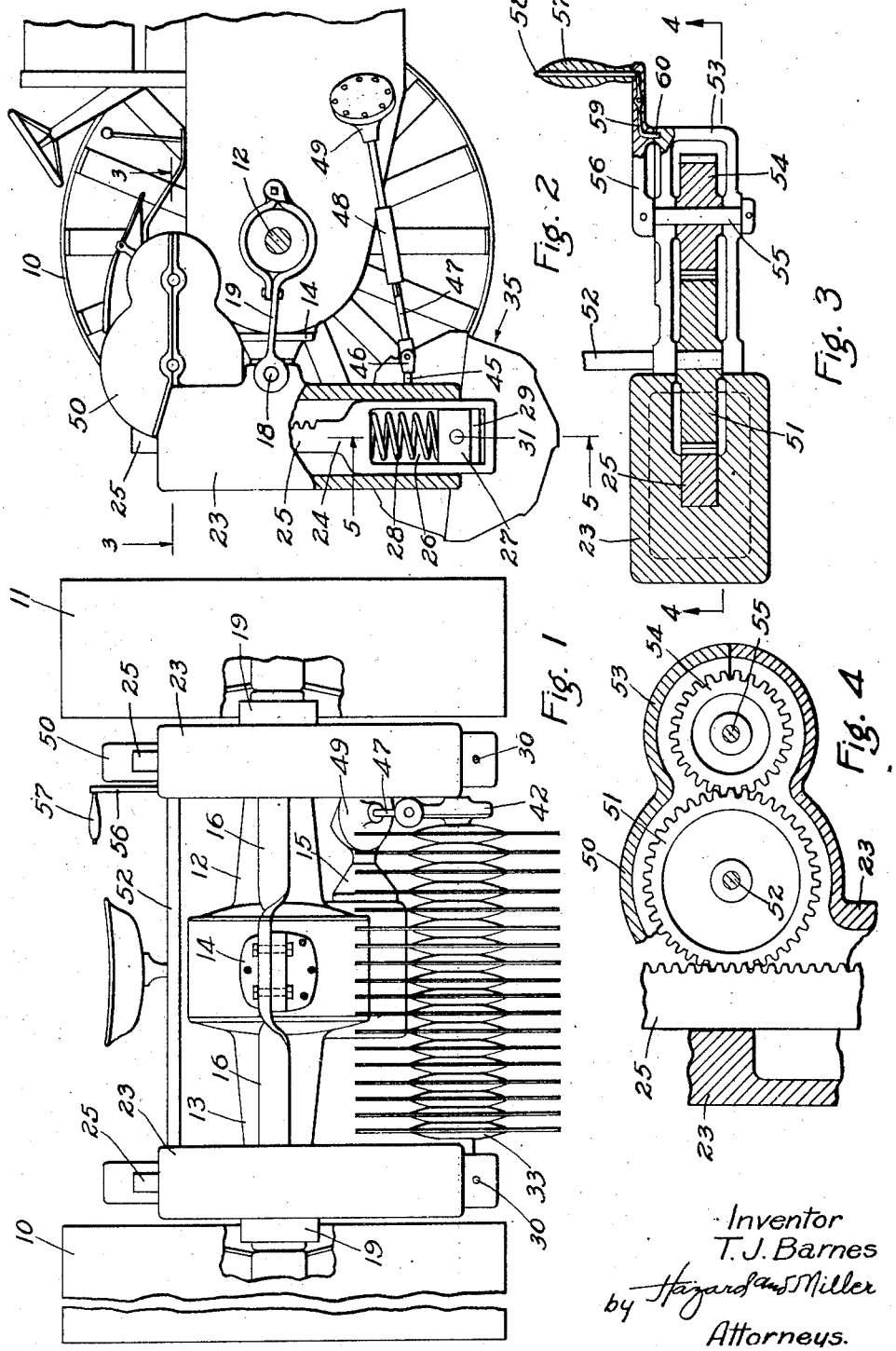

Inventor
T. J. Barnes
by Hazard and Miller
Attorneys.

Patented July 26, 1927.

1,637,098

UNITED STATES PATENT OFFICE.

THOMAS J. BARNES, OF AZUSA, CALIFORNIA.

PULVERIZER.

Application filed February 6, 1925. Serial No. 7,317.

This invention relates to improvements in pulverizers.

One object of the invention is to provide a pulverizer adapted to be attached to a tractor and which is especially designed to be attached to a tractor known in the trade as the Fordson, and to provide means whereby the discs or blades of the pulverizer may be rotated by the tractor, so as to efficiently and thoroughly pulverize the ground over which the pulverizer passes.

A further object of the invention is to provide a pulverizer adapted to be attached to a tractor and to provide means for raising and lowering the pulverizing blades so that the depth which the blades penetrate the ground may be varied.

A still further object of the invention is to provide an improved pulverizing device whereby the blades of the pulverizer may be readily applied or detached from the pulverizer.

With the foregoing and other objects in view which will be made manifest in the following detailed description and pointed out in the appended claim, reference is had to the accompanying drawings for an illustrative embodiment of the invention, wherein:

Figure 1 is a rear elevation of the pulverizer as applied to a tractor;

Fig. 2 is a side elevation showing a portion of the tractor to which the pulverizer has been applied, parts of the pulverizer being shown in section;

Fig. 3 is a horizontal section taken substantially on the line 3—3 of Fig. 2;

Fig. 4 is a vertical section taken substantially on the line 4—4 of Fig. 3;

Figure 6:
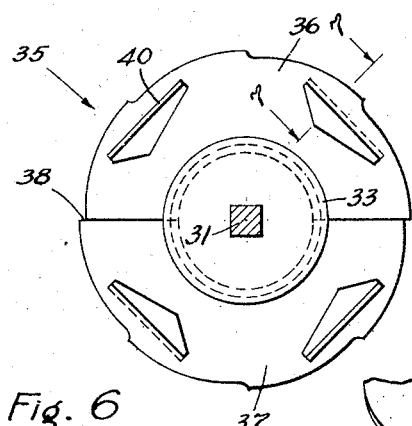
Fig. 6 is a side elevation showing one of the blades or discs of the pulverizer.

Referring to the accompanying drawings wherein similar reference characters designate similar parts throughout, the tractor is shown as having rear drive wheels 10 and 11, which are mounted upon an axle 12 disposed within an axle housing 13. Upon the rear of the body or the frame of the tractor, there is disposed an attachment 14 adapted to attach a draw bar to the tractor. The particular tractor described is provided with a suitable housing, indicated at 15, which is adapted to receive a suitable mechanism whereby a power take-off for the tractor is provided. Usually a pulley attachment is adapted to be mounted upon the housing 15 so as to be driven by the side drive for operating various farm machinery and the like.

In mounting the pulverizer upon the tractor, a brace 16 has its center rigidly secured upon the draw bar attachment 14 and has its ends bent so as to present a vertical surface, as indicated at 17. The outer ends of the brace 16 are rounded, as indicated at 18, and receive the ends of brackets 19. The brackets 19 extend forwardly from the brace 16 beneath the axle housing 13, and a clamp 20 is pivoted to the forward end of each bracket 19, as at 21. The clamp 20 extends over the top of the axle housing 13 and has its rearward end fastened to the body of the bracket 19 as by a bolt and nut 22. Adjacent the ends of the brace 16 there are mounted boxes 23 which form guide means for the pulverizer. Members 24 are disposed within the boxes 23 and are vertically slidable therein. These members are in the form of racks, as indicated at 25, and have their lower ends slotted, as indicated at 26. Bearing blocks 27 are disposed within the slots 26 of each of the members 24 and are slidable therein, although they are urged downwardly by means of springs 28. Adjacent the bottom of each of the slots 26 are arranged rockers 29 which have pins 30 pivotally mounted in the sides of the members 24, which define the slots 26.

Figure 5:
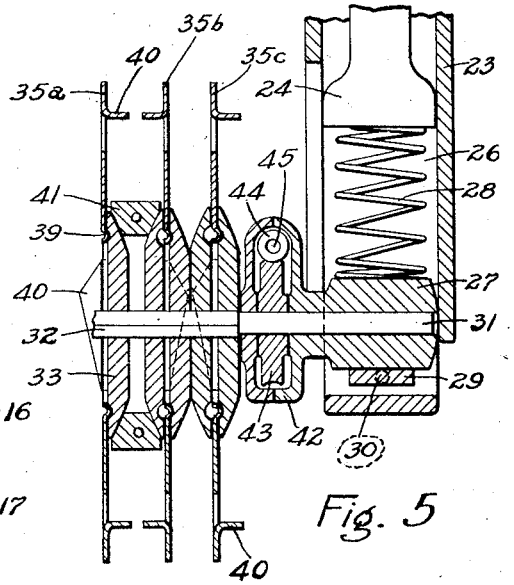
Fig. 5 is a vertical section through a portion of the pulverizer taken on the line 5—5 of Fig. 2.
Figure 7:
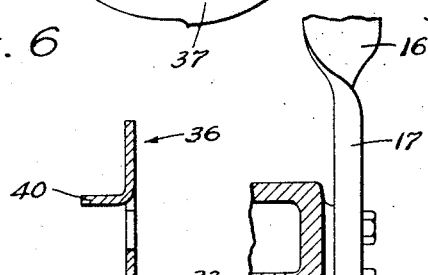
Fig. 7 is a section taken substantially on the line 7—7 of Fig. 6.
Figure 8:
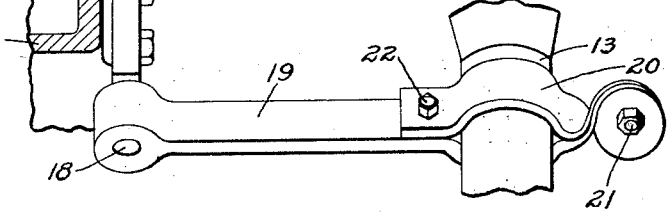
Fig. 8 is a perspective view showing a detail of the clamping means and supporting means for the pulverizer.
Figure 9:
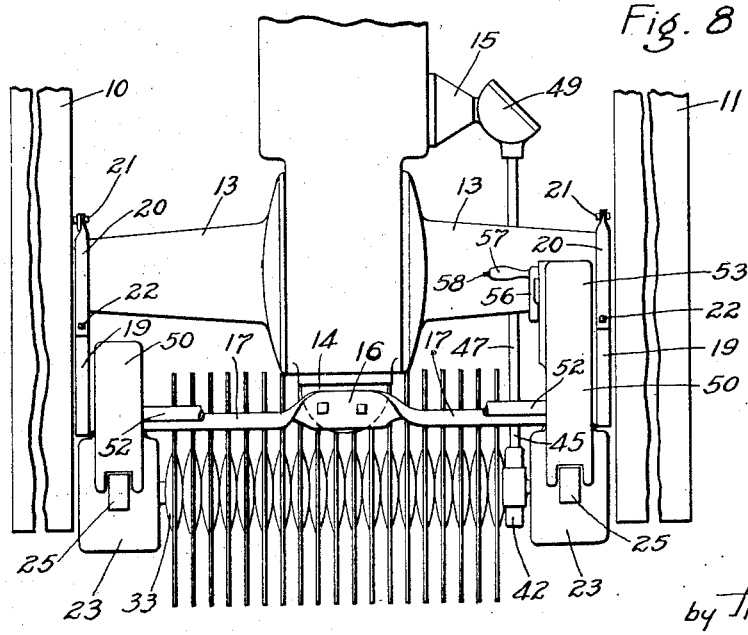
Fig. 9 is a top plan view of the tractor to which the pulverizer has been attached.

A shaft 31 is journaled in the bearing blocks 27 and extends transversely across the tractor at the rear thereof. This shaft has its center portion squared, as indicated at 32, and is adapted to receive clamping discs 33. The clamping discs 33 are held against rotation upon the shaft 31 because of the squared portion 32, and upon the opposed faces of each pair of clamping discs there are arranged grooves 34. Between each pair of clamping discs 33 there is arranged a disc or blade, generally designated at 35. The discs or blades 35 are formed of two complementary halves 36 and 37, although each disc may be made of more segments if so desired. Each half is semi-circular in form and has teeth 38 formed upon its periphery. Adjacent the inner edge of each half there is formed a bead 39 adapted to occupy the groove 34 in one of the clamping discs 33 so as to prevent the halves from slipping out from between the clamping discs when the clamping discs are forced together. Lugs 40 are struck out from the body of each of the halves 36 and 37 and in the preferred form of construction, these lugs, when the halves of the discs are mounted, are so arranged as to extend toward each other from adjacent discs. Upon each half there are two lugs 40, one being struck out toward one side of the disc and the other lug being struck out from the opposite side of the disc. The blades or discs 35 when assembled upon the shaft 31, as indicated at 35$^a$, 35$^b$ and 35$^c$, are so arranged that the lugs 40 upon the blades 35$^a$ and 35$^b$ extend toward each other. The other lug upon the half of the disc 35$^b$ which is struck out in the opposite direction is opposite a corresponding lug upon the blade or disc 35$^c$, as indicated in dotted lines upon Fig. 5. When the halves 36 and 37 of each of the blades or discs 35 have been placed between their respective clamping discs 33, a wedge ring 41 is clamped between a pair of clamping discs, as shown in Fig. 5. This wedge ring is adapted to urge all of the clamping discs 33 upon the shaft 31 toward each other and thus clamp the halves or sections of the blades 35, preventing their removal.

Adjacent one end of the shaft 31 there is mounted a suitable housing 42, within which is disposed a worm wheel 43 rigidly keyed upon the shaft 31. A worm 44 meshes with the worm wheel 43 and is mounted upon a drive rod 45. The drive rod 45 is connected by means of a universal joint 46 to an extensible drive rod 47 having an extension joint 48. The opposite end of the extensible drive rod 47 has mounted thereon a beveled gear which meshes with a beveled gear driven by the side drive mechanism within the housing 15. Both of these beveled gears are mounted upon suitable bearings within the housing 49. In this manner, as the tractor is driven, the side drive mechanism may be employed which will rotate the extensible drive rod 47 while the tractor is moving and in this manner drive the shaft 31, causing rotation of the blades 35 and thus thoroughly pulverize the ground. If the discs 35 should strike a hard spot in the ground, the shaft 31 may rise against the action of the coil spring 28, and if one side only of the shaft 31 is lifted, the opposite side within its bearing block may pivot upon the rocker 29.

As a means for vertically adjusting the members 24 and, consequently, the shaft 31, I provide a housing indicated at 50 within which is disposed a gear 51 which meshes with the rack 25. The gear 51 is mounted upon a spindle 52 which extends transversely across the tractor between each of the housings 50. Upon one side of the tractor, preferably upon the right side, the housing 50 has an extension indicated at 53, in which there is mounted a pinion 54 which meshes with the gear 51. The pinion 54 is mounted upon a spindle 55 carrying a crank 56. In the handle 57 of the crank 56 there is slidable a pin 58 which operates a lever 59 upon which is mounted a pin 60 adapted to engage any of a number of apertures formed in the side of the housing extension 53. In this manner by rotating the crank 56, the pinion 54 will rotate the gear 51. As the gear upon the right side of the tractor is rigidly mounted upon the spindle 52, the corresponding gear 51 upon the opposite side of the tractor, which is also mounted upon the spindle 52, will be caused to rotate with it. In this manner both of the members 24 may be simultaneously lifted within their boxes 23 and vertically adjust the shaft 31.

From the above it is seen that I have provided an improvement adapted to be readily attached to a Fordson tractor whereby the pulverizing blades may be driven by the tractor as the tractor moves along over the field, and that it is not necessary to materially change the construction of the tractor. Furthermore, I employ the devices already provided upon the tractor for other purposes for attaching my improved pulverizer and for driving it.

It will be understood that various changes in the detail of construction may be made without departing from the spirit or scope of the invention as defined by the appended claim.

I claim:

In combination with a tractor, a transverse brace secured to the draw bar attaching means of the tractor, brackets secured to the axle housing of the tractor and to said brace, supporting boxes for pulverizing devices rigidly secured to said brace, a shaft journaled in said supporting boxes, and pulverizing devices mounted upon said shaft.

In testimony whereof I have signed my name to this specification.

THOMAS J. BARNES.